No. 828,315. PATENTED AUG. 14, 1906.
A. S. HUBBARD.
ELECTRICAL SYSTEM OF DISTRIBUTION.
APPLICATION FILED APR. 10, 1905.
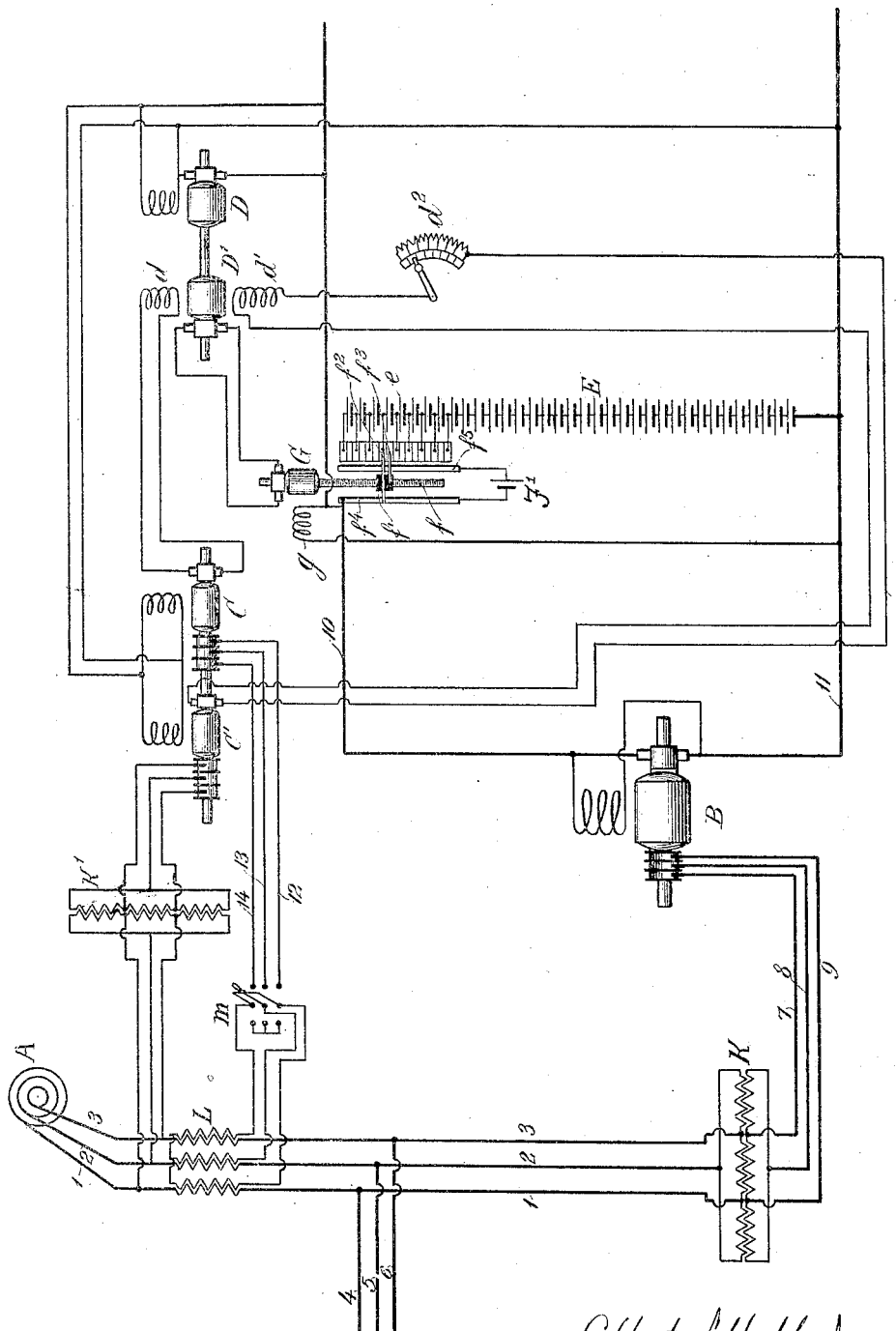

UNITED STATES PATENT OFFICE.

ALBERT S. HUBBARD, OF GREENWICH, CONNECTICUT.

ELECTRICAL SYSTEM OF DISTRIBUTION.

No. 828,315.   Specification of Letters Patent.   Patented Aug. 14, 1906.

Application filed April 10, 1905. Serial No. 254,630.

*To all whom it may concern:*

Be it known that I, ALBERT S. HUBBARD, a citizen of the United States, residing in Greenwich, in the county of Fairfield and State of Connecticut, have invented certain new and useful Improvements in the Art of Electrical Systems of Distribution, of which the following is a specification.

My invention relates to electrical systems of distribution, and more especially to systems in which there is an alternating-current generator connected through a rectifying device to a direct-current circuit in which is a battery connected across the circuit and means are provided to automatically regulate the battery-current.

The object of the invention is to provide an efficient arrangement of apparatus to regulate the battery in accordance with the load on the alternating-current generator, and to this end I provide a special rectifying device which receives an alternating current that varies in accordance with the variations of load on the alternating-current generator, and I cause the direct current from this rectifying device to energize or partly energize the field of a generator to govern the direction and intensity of the current from such generator. The current from this latter generator actuates a motor which operates in either direction to add to or remove cells from the battery-circuit.

The more specific features of my invention will be pointed out hereinafter in connection with the detailed description of the specific embodiment of my invention shown in the drawing.

The drawing is a diagram illustrating a specific system embodying the various features of my invention.

A is an alternating-current generator having conductors 1 2 3 leading therefrom.

4 5 6 represent the conductors of an alternating-current work-circuit.

K represents a transformer the primary of which is connected to conductors 1 2 3, while the secondary is connected by conductors 7 8 9 to the alternating-current end of a rectifying device, in this case illustrated as a rotary converter B.

10 and 11 are the conductors of the direct-current circuit connected to the direct-current end of converter B.

E is a storage battery, the end cells $e\ e$ thereof being connected to the contact $f^4$ of the end-cell switch, as shown. The end-cell switch is connected to the conductor 10, while the other end of the battery is connected to the conductor 11. This battery E is adapted to steady the load on the alternating-current generator A, and this regardless of whether that load tends to change because of changes in the work-circuit 4 5 6 or whether it tends to change because of changes in any work-circuit that may be connected on the direct-current side of the system.

I will now describe the means that are employed to regulate the battery in order that it may more effectually steady the load on the alternating-current generator.

L is a transformer placed in the conductors 1 2 3 and between the generator A and the work-circuit 5 6, so that the current in the primary of the transformer L varies in accordance with the variations of current in generator A. The secondary of transformer L is connected by conductors 12, 13, and 14 with a rectifying device C, which is preferably driven at synchronous speed by a rotary C', receiving current from the alternating-current circuit through the transformer K'.

D and D' represent, respectively, the motor and generator end of a direct-current motor-generator, the motor D being connected across the circuit 10 11. The generator end D' of this motor-generator is energized by two windings. One of these, $d$, is connected to the direct-current end of the rectifying device C, and therefore receives a current that varies in accordance with the load on generator A. The other field-coil D' should receive a substantially constant current, and to this end I preferably connect it to the direct-current end of the rotary C', as shown. The proper adjustment of the two fields of the generator D' should be such that at the desired average load for generator A the magnetization afforded by coil $d$ should exactly equal and oppose the magnetization afforded by coil $d'$. With this adjustment any change in the current generated by A from the average desired will cause the magnetization afforded by coil $d$ to rise above or fall below the constant magnetization afforded by coil $d'$, with the result that a current in one direction or the other will be generated by D'.

$d^2$ is a resistance that may be adjusted to properly adjust the strength of coil $d'$, and so adjust the average load on generator A at any desired point.

G represents a motor whose armature is connected to the armature of generator D', so that the rotation of this motor in either direction is entirely dependent upon the current output of the generator D'. This motor is energized by a field-coil $g$, connected to any source of approximate constant potential—as, for example, in the case shown across the circuit 10 11.

The motor G in its rotation turns the screw $f$, the turning of which reciprocates the nut $f'$, carrying the two contacts $f^3$ $f^3$, the former of which connects across from the terminals of the ends cells to the contact $f^4$, connected to conductor 10, while the other movable contact $f^3$ connects across from the terminals of the end cells to the contact $f^5$.

F' is a counter-electromotive-force cell connected between the fixed contacts $f^4$ and $f^5$ to prevent the short-circuiting of any cell in the movement of the switch. If desired, a resistance may be used instead of this counter-electromotive-force cell.

It will be seen by this arrangement that any change in generator A makes itself felt in the rectifying device C, and this in turn causes a like change in the magnetization afforded by the coil $d$, and this in turn affects the current output of the generator, causing the motor G to rotate in one direction or another until the current in A reaches the desired normal.

When there is an increase of current in the alternating-current generator, there is an increase of current in the rectifying device C, and therefore in the field-coil $d$ of the generator B'. Under these circumstances the energizing effect of this coil is strong enough to overcome that of the coil $d'$. The direction of current to the motor G will be such as to rotate it in a direction to move the nut $f'$ upwardly, so inserting additional cells in the battery-circuit. This increases the voltage of the battery, and therefore causes a discharge of the battery to the work-circuit 4 5 6 or to any other work-circuit that might be connected to the system. This insertion of cells will continue until the load upon generator A has again become reduced sufficiently to cause the stoppage of motor G. On the other hand, if the current in generator A falls below the desired average the energizing effect of coil $d'$ becomes greater than that of coil $d$. Then the armature D' generates current in such a direction that the motor will be reversed and withdraw battery-cells from the circuit. It will be seen, therefore, that the tendency of the system will be to constantly insert or withdraw battery-cells according as the generator-current rises or falls above or below the point at which the system is adjusted, and therefore that a constant generator-current is maintained.

At M, I have shown a double-throw switch, which when closed in one direction connects the secondary of transformer L with the alternating end of the regulating rectifying device C and when closed in the other direction short-circuits the secondary of said transformer, so as to permit the primary current to be uninfluenced by the secondary when for any reason it is desirable that the regulating apparatus be not employed—as, for example, when only the alternating-current side of the system is to be used.

Having thus described my invention, what I claim as new, and desire to protect by Letters Patent, is—

1. The combination of an alternating-current-generator and a circuit therefrom, a direct-current circuit, a rectifying device between the two circuits, a storage battery across the direct-current circuit, a motor controlling the number of cells in the battery-circuit, and means dependent upon the condition of the alternating-current circuit for starting the motor in either direction.

2. The combination of an alternating-current generator and a circuit therefrom, a direct-current circuit, a rectifying device between the two circuits, a storage battery across the direct-current circuit, a motor controlling the number of cells in the battery-circuit, a generator supplying current to said motor, and means dependent upon the condition of the alternating-current circuit for varying the power of said generator.

3. The combination of an alternating-current generator and a circuit therefrom, a direct-current circuit, a rectifying device between the two circuits, a storage battery across the direct-current circuit, a motor controlling the number of cells in the battery-circuit, a generator supplying current to said motor, a regulating-coil for said generator, and means for varying the current in said coil dependent upon changes of electrical conditions of the alternating-current circuit.

4. The combination of an alternating-current generator and a circuit therefrom, a direct-current circuit, a rectifying device between the two circuits, a storage battery across the direct-current circuit, a motor controlling the number of cells in the battery-circuit, a generator supplying current to said motor, a regulating-coil for said generator, a coil in the alternating-current circuit and means for varying the current in the former coil in accordance with the variations of current in the latter coil.

5. The combination of an alternating-current generator and a circuit therefrom, a direct-current circuit, a rectifying device between the two circuits, a storage battery across the direct-current circuit, a motor controlling the number of cells in the battery-circuit, a generator supplying current to said motor, a regulating-coil for said generator, a rectifying device receiving current from the alternating-current circuit, and a circuit including the direct-current end of said rectifying device and said regulating-coil.

6. The combination of an alternating-current generator and a circuit therefrom, a direct-current circuit, a rectifying device between the two circuits, a storage battery across the direct-current circuit, a motor controlling the number of cells in the battery-circuit, a dynamo connected with said motor to supply current thereto, a field-coil for said dynamo, a rectifying device receiving an alternating-current that varies in accordance with variations of load of the alternating-current generator, and a circuit including the direct-current end of said dynamo.

7. The combination of an alternating-current generator and a circuit therefrom, a direct-current circuit, a rectifying device between the two circuits, a storage battery across the direct-current circuit, a motor controlling the number of cells in the battery-circuit, a dynamo connected with said motor to supply current thereto, two field-windings for said dynamo, means for maintaining a substantially constant current in one of said field-windings, and means dependent upon changes of condition in the alternating-current circuit for varying the current in the other of said field-windings.

8. The combination of an alternating-current generator and a circuit therefrom, a direct-current circuit, a rectifying device between the two circuits, a storage battery across the direct-current circuit, a motor controlling the number of cells in the battery-circuit, a dynamo connected with said motor to supply current thereto, two field-windings for said dynamo, a rectifying device connected to each winding, the said rectifying devices being connected to the alternating-current circuit to receive respectively a substantial constant current and a current varying in accordance with variations of current from the alternating-current generator.

9. The combination of an alternating-current generator and a circuit therefrom, a direct-current circuit, a rectifying device between the two circuits, a storage battery across the direct-current circuit, a motor controlling the number of cells in the battery-circuit, a dynamo connected with said motor to supply current thereto, two field-windings for said dynamo, a rectifying device connected in shunt to the alternating-current circuit and supplying current to one of said field-windings, a transformer in the current of the alternating-current generator and a rectifying device connected to the secondary of said transformer supplying current to the other of said field-windings.

10. In apparatus for automatic regulation, a direct-current generator, opposing field-windings thereon, an alternating-current circuit, and means for independently rectifying currents from the alternating-current circuit for the circuits of the said field-windings.

11. The combination of an alternating-current generator, a circuit therefrom, a working circuit connected to said circuit, a transformer connected in series with the generator between the generator and the work-circuit connections, a direct-current circuit, a rectifying device between the alternating and direct current circuits, a battery connected across the direct-current circuit, another rectifying device receiving current from the secondary of said transformer, a direct-current generator, a field-winding for said generator connected with said rectifying device, a motor receiving current from said generator and controlling by its rotation the number of cells of the battery in circuit.

12. The combination of an alternating-current generator, a circuit therefrom, a working circuit connected to said circuit, a transformer connected in series with the generator between the generator and the work-circuit connections, a direct-current circuit, a rectifying device between the alternating and direct current circuits, a battery connected across the direct-current circuit, another rectifying device receiving current from the secondary of said transformer, a direct-current generator, a field-winding for said generator connected with said rectifying device, an opposing field-winding for said generator connected to receive a substantially constant current, a motor receiving current from said generator and controlling by its rotation the number of cells of the battery in circuit.

13. The combination of an alternating-current generator and a circuit therefrom, a direct-current circuit, a rectifying device between the two circuits, a storage battery across the direct-current circuit, a motor controlling the number of cells in the battery-circuit, a direct-current motor-generator, a circuit including said motor and the generator end of the motor-generator, and means dependent upon the condition of the alternating-current circuit for varying the power of said generator.

14. The combination of an alternating-current generator and a circuit therefrom, a direct-current circuit, a rectifying device between the two circuits, a storage battery across the direct-current circuit, a motor controlling the number of cells in the battery-circuit, a direct-current motor-generator, a circuit including said motor and the generator end of the motor-generator, opposing field-windings for the said generator end, means for supplying a substantially constant current to one of said field-windings, and means for varying the current in the other of said field-windings dependent upon the condition of the alternating-current circuit.

15. The combination of an alternating-current generator and a circuit therefrom, a direct-current circuit, a rectifying device between the two circuits, a storage battery across the direct-current circuit, an alternating work-circuit, a motor controlling the number of cells in the battery-circuit, and means for starting the motor in either direction dependent upon the load on the alternating-current generator.

16. In a regulating apparatus, a series transformer, a rectifying device connected to the secondary thereof, a direct-current generator, a regulating-coil therefor connected to the said rectifying device, and a double-throw switch in the circuit from the said secondary to the rectifying device arranged to either close said circuit or to open the circuit and short-circuit said secondary.

17. The combination of an alternating-current generator and a circuit therefrom, a direct-current circuit, a rectifying device between the two circuits, a storage battery connected to the direct-current circuit, an end-cell switch for said battery, and means dependent upon the condition of the alternating-current circuit for controlling said end-cell switch.

18. The combination of an alternating-current generator and a circuit therefrom, a direct-current circuit a rectifying device between the two circuits, a storage battery connected to the direct-current circuit, an end-cell switch for said battery, an electromagnetic device for controlling said end-cell switch, and means dependent upon the condition of the alternating-current circuit for varying the current to said electromagnetic device.

In testimony whereof I have signed my name to this specification in the presence of two subscribing witnesses.

ALBERT S. HUBBARD.

Witnesses:
   EDWIN SEGER,
   JOHN O. GEMPLER.